United States Patent
Heinloth et al.

(10) Patent No.: US 8,584,556 B2
(45) Date of Patent: Nov. 19, 2013

(54) METHOD AND DEVICE FOR THE PRECISION MACHINING OF CRANKSHAFTS AND CAMSHAFTS

(75) Inventors: Markus Heinloth, HeinlothPostbauer-Heng (DE); Jürgen Bär, Fürth (DE); Helmut Klein, Abenberg (DE); Ralf Klötzer, Langewiesen (DE)

(73) Assignee: Kennametal Inc., Latrobe, PA (US)

( * ) Notice: Subject to any disclaimer, the term of this patent is extended or adjusted under 35 U.S.C. 154(b) by 80 days.

(21) Appl. No.: 13/376,209

(22) PCT Filed: Jun. 18, 2010

(86) PCT No.: PCT/EP2010/003703
§ 371 (c)(1),
(2), (4) Date: Dec. 5, 2011

(87) PCT Pub. No.: WO2010/149317
PCT Pub. Date: Dec. 29, 2010

(65) Prior Publication Data
US 2012/0076599 A1   Mar. 29, 2012

(30) Foreign Application Priority Data

Jun. 26, 2009   (DE) .......................... 10 2009 030 856

(51) Int. Cl.
*B23C 5/24* (2006.01)
*B23C 5/16* (2006.01)

(52) U.S. Cl.
USPC ............................................. 82/106; 82/107

(58) Field of Classification Search
USPC ........... 82/106, 1.11, 107; 409/199, 200, 234; 407/37, 40, 46
See application file for complete search history.

(56) References Cited

U.S. PATENT DOCUMENTS

| | | | |
|---|---|---|---|
| 6,322,300 B1 * | 11/2001 | Santorius et al. | 409/199 |
| 6,506,004 B1 * | 1/2003 | Kohlhase et al. | 409/131 |
| 6,629,806 B1 * | 10/2003 | Santorius et al. | 409/132 |
| 6,684,500 B1 * | 2/2004 | Kohlhase et al. | 29/888.08 |
| 6,973,861 B2 * | 12/2005 | Shimomura | 82/106 |
| 7,402,010 B2 * | 7/2008 | Bauer et al. | 409/234 |
| 7,588,397 B2 * | 9/2009 | Bone et al. | 408/1 R |

FOREIGN PATENT DOCUMENTS

| | | |
|---|---|---|
| CN | 1671501 A | 9/2005 |
| CN | 101080296 A | 11/2007 |
| DE | 19743971 A1 | 4/1999 |
| DE | 10 2004 022360 A1 | 11/2005 |
| EP | 0 912 284 B1 | 1/2002 |
| EP | 1 528 966 B1 | 4/2009 |

* cited by examiner

*Primary Examiner* — Will Fridie, Jr.
(74) *Attorney, Agent, or Firm* — Larry R. Meenan, Esq.

(57) ABSTRACT

The invention relates to a method and a device for the precision machining of crankshafts or camshafts to final size tolerances $R_z<10$ μm, preferably ≤5 μm and concentricity tolerances ≤30 μM, preferably 6 μm. The crankshafts or camshafts has been machined by a cutting operation and at least partly subjected to hardening. According to the invention, after an initial cutting operation and subsequent hardening to 45 to 60 HRC, preferably 50 to 53 HRC, a final cutting operation is carried out using cutting inserts fitted with CBN or PCD inlets. The device used for this purpose has cutting inserts which are fitted with CBN or PCD inlets, wherein cutting inserts clamped in place laterally, radially and tangentially follow each other alternately.

4 Claims, 6 Drawing Sheets

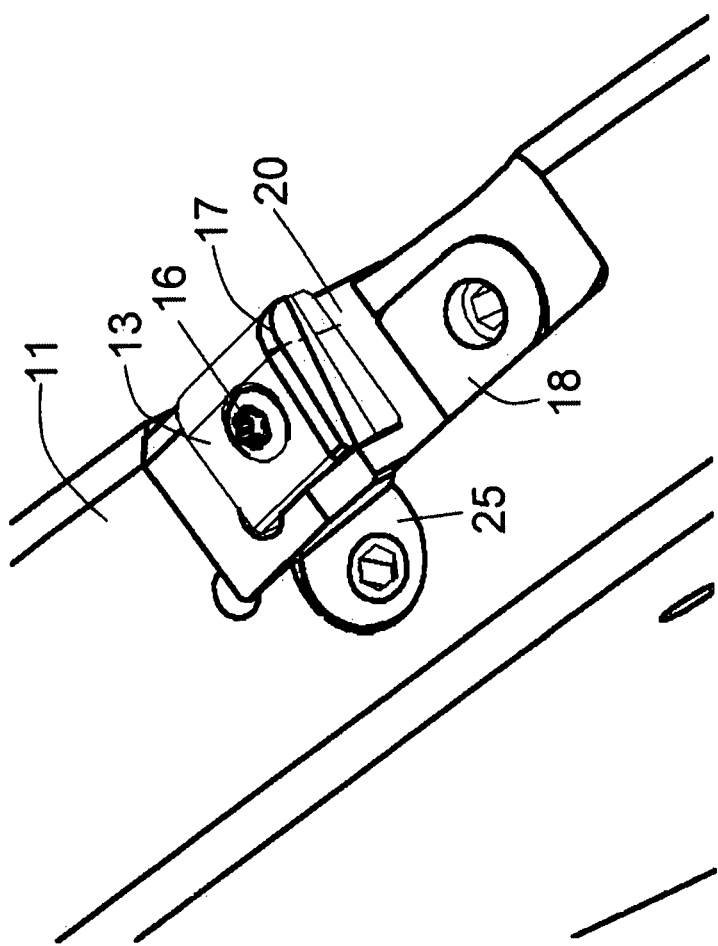

METHOD AND DEVICE FOR THE PRECISION MACHINING OF CRANKSHAFTS AND CAMSHAFTS

CLAIM TO PRIORITY

This application is a National Phase of International Application PCT/EP2010/003703, filed on Jun. 18, 2010, which claims priority to German Application No. 10 2009 030 856.3, filed on Jun. 26, 2009, the entire contents of all these applications are incorporated herein by reference.

BACKGROUND OF THE INVENTION

1. Field of the Invention

The invention relates to a method and a device for the precision machining of crankshafts or camshafts to final size tolerances $R_z<10$ μm, preferably ≤5 μm, and concentricity tolerances≤30 μm, preferably ≤6 μm. The crankshafts or camshafts have been machined by a cutting operation and at least partly subjected to hardening.

2. Description of Related Art

In the machining methods known according to the prior art, the crankshafts normally pass through a plurality of machining stages. First of all, the cast or forged shafts are subjected to a cutting operation, such as turn broaching, turn-turn broaching, internal rotary milling and external milling, especially at high milling speeds wherein the allowance provided from the casting or forging point of view is removed down to a residual value within the millimeter range.

In order to increase the abrasion resistance of the crankshaft, the shaft is at least partly hardened according to a further step, for example by induction hardening, in order to achieve the desired material structure or microstructure. During the hardening, a distortion and a slight dimensional change of the crankshaft or of the camshaft cannot be ruled out, which has to be compensated for in a subsequent machining step.

The crankshafts are normally ground in a third machining step, for example using a grinding wheel, the axis of rotation of which moves parallel to the axis of rotation of the rotating crankshaft or camshaft. The grinding is mostly carried out with the addition of cooling lubricants in order to avoid excessive heating of the crankshaft during the subsequent grinding operation. Apart from the fact that the disposal of the resulting grinding sludge, which contains both the ground-off shaft particles and the torn-out abrasive grains of the grinding wheel, is costly, since grinding sludge has to be handled as special waste, considerable heating of the workpiece cannot be completely ruled out, nor can unfavorable effects on the workpiece surface, which produce an undesirable surface structure within the microscopic range as a result of the high machining pressures during the grinding.

SUMMARY OF THE INVENTION

Proceeding therefrom, the object of the present invention is to provide a method and a device of the type mentioned at the beginning with which said disadvantages are avoided.

According to the invention, the crankshaft or camshaft is first of all subjected to an initial cutting operation and subsequent hardening, for instance to values of between 45 to 60 HRC, preferably 50 to 53 HRC. This is followed by a final cutting operation using cutting inserts which are fitted with CBN or PCD inlets and with which the shape is produced to the correct final size. Used for this purpose in terms of equipment is a device which consists of an internal or external milling cutter, on the periphery of which radially and/or axially adjustable cutting inserts are fastened, which are each fitted with CBN or PCD inlets, wherein cutting inserts clamped in place laterally, radially and tangentially follow each other alternately. However, the number of tangentially clamped cutting inserts, which serve for the smoothing of the big-end or main bearings, can be much smaller than the number of laterally clamped cutting inserts, which are required for machining the cheeks and for producing the undercuts respectively.

Replacing the grinding that follows hardening with a cutting operation not only has the advantage that the entire production line can be run in a dry mode, i.e. without the use of cooling lubricant, whereby in particular the lubricant disposal, which is encumbered with chips and grinding sludge, or the reprocessing of the lubricant, is not necessary, but that the production accuracy is also increased. However, this assumes that the cutting work is carried out with CBN or PCD cutting edges, which first makes it possible to sufficiently accurately produce the crankshaft or camshaft to the precise final size while maintaining low tolerances. The mere replacement of a grinding method after the hardening with a cutting operation using conventional carbide cutting inserts does not in any case produce the desired final sizes, for which reason precision grinding, for instance by means of abrasive belts, must also follow such cutting operations. The use of CBN or PCD cutting edges provides a surface structure which allows a tolerance within the range $R_z<10$ μm and a concentricity tolerance below 30 μm, preferably around 6 μm or less, to be maintained.

If work is carried out with a defined cutting edge, i.e. with a cutting operation, both before and after the hardening, a greater degree of out-of-roundness in the first machining stage can be removed in the final cutting operation, since the passive force on the grinding location is markedly lower than during grinding. During a final cutting operation, one or two milling revolutions are sufficient to remove out-of-roundness, whereas during grinding repeated revolutions, with the disadvantages described above, were necessary.

As a further positive effect, the use of PCD or CBN cutting edges, in addition to a high surface quality of the workpieces, also results in long service life, whereby the economic efficiency of the treatment method is increased. The high abrasion resistance of the PCD or CBN cutting edges also allows a high degree of process reliability and high setting accuracy to be achieved. The resulting increase in price of the cutting inserts (compared with one-piece carbide cutting inserts) is more than compensated for in a shorter cycle time as a result of the greater tool life quantity per cutting edge, such that the production of the crankshaft or camshaft becomes less expensive overall.

The peak-to-valley height $R_z$ represents the distance between the highest prominence and the deepest recess of a microscopic surface structure within a defined test section, the value of 5 test sections which is thus determined being determined for determining $R_z$. In this way, freak values from the surface profile, namely very high peaks and very deep valleys, are not overvalued.

The concentricity is determined by circles which are placed on the inside and outside against the actual contour of the workpiece. The two circles are arranged concentrically to one another, such that the actual cross-sectional profile of a workpiece lies in the space between these two circles. The present invention is based in particular on the knowledge that cutting processes by means of an external or internal milling cutter ensure a higher concentricity accuracy than excessive grinding, in which the material removal is relatively small anyway. If exact cutting insert positioning which is accurate over a long tool life is ensured by the selection of the cutting tools and the adjustability on an external or internal milling cutter, good results can be achieved despite the lack of grinding, and these results satisfy the demands according to claim 1 with regard to final size tolerances and concentricity tolerances.

Preferred configurations of the cutting inserts which are fitted with CBN or PCD inlets are described in the dependent claims. Thus, in particular the respective cutting insert for machining the big-end or center bearings of a crankshaft or camshaft is provided with a cutting edge of roof-shaped design which has two cutting edge sections which enclose an angle with one another of 173° to 178°, preferably 175°. The range of use is increased by the two useful cutting edges formed in this way, i.e. the cutting insert can be used for both right-hand and left-hand cutting work. The respective cutting edges can be reground in order to increase the service life of the cutting insert.

Said cutting edge section ends merge via an edge radius of R=0.4 mm to 1.5 mm (depending on size) into secondary cutting edges which are inclined by 2 to 3°, preferably 2.5°, relative to a normal to the locating surface of the cutting insert.

According to a further configuration of the invention, the laterally clamped cutting inserts for machining the cheeks have a CBN or PCD inlet, each with two useful cutting edges, which enclose an angle of 80°±5°; the two cutting edges are connected to one another via a cutting corner radius of R=1 to 1.5 mm. These cutting edges can also be reground.

All the cutting inserts arranged on an internal or external milling cutter are preferably fastened in cassettes by a setting device which allows an exact adjustment of the position of the cutting inserts relative to the tool holder.

During machining of bearings, the crowning of the bearing should preferably be between 0 and 4 μm.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

Exemplary embodiments of the invention are shown in the drawing, in which:

FIGS. 2a, 2b show a detail view of a cassette with a laterally arranged cutting insert'

DETAILED DESCRIPTION OF THE INVENTION

External milling cutters, which rotate about their longitudinal axis during the cutting and have a disk-shaped tool holder which has peripherally arranged cassettes, which are each fitted with a cutting insert and which are fixed on an annular or partly annular or segmental holder detachably fastened either directly to a machine spindle or indirectly to a machine spindle via an adapter, are described, for example, in DE 10 2007 013 153 A1.

Figure 1:
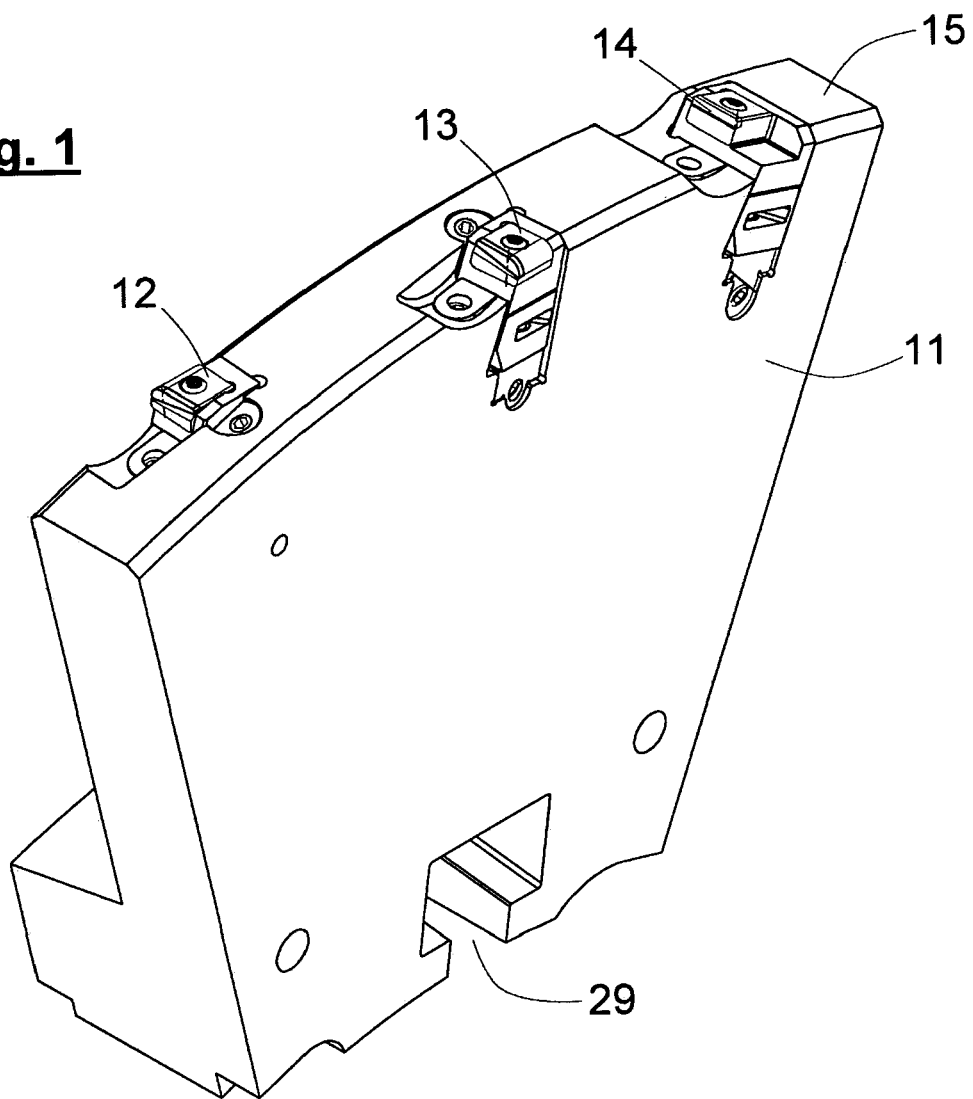
FIG. 1 shows a perspective view of a tool segment with three different cassettes.

FIG. 1 shows a segmental holder 11 of such an external milling cutter. In the bottom region, this holder 11 has an open slot-shaped recess 29 which ends blind and has at its end a stop point for a screw shank. This segmental holder 11 is axially clamped to a spindle (not shown) via clamping wedges. A plurality of segments 11, which are fastened next to one another via suitable clamping pieces, form a complete ring which is fixed to an existing spindle. Individual segments, compared with a complete one-piece annular body, have the advantage that partial exchange is possible in order to change cutting inserts. In FIG. 1, a cutting insert 12 clamped laterally on the left, a cutting insert 13 clamped laterally on the right and a centrally fastened cutting insert 14 are fastened on the periphery 15. The cutting inserts 12 and 13 are adjustable both radially and axially and with regard to their cutting edge inclination for setting the "tilt", whereas at the cutting insert 14 the axial adjustability is unnecessary.

Figure 2A:
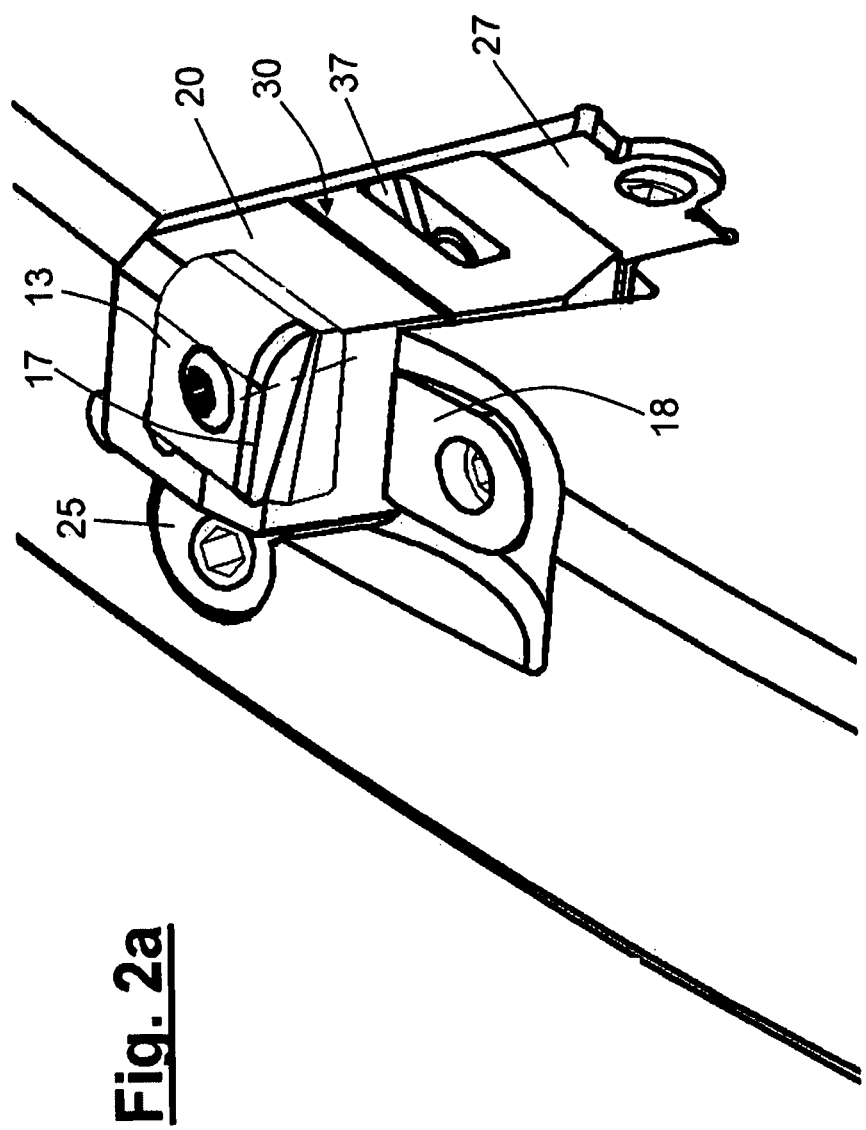
Figure 3A:
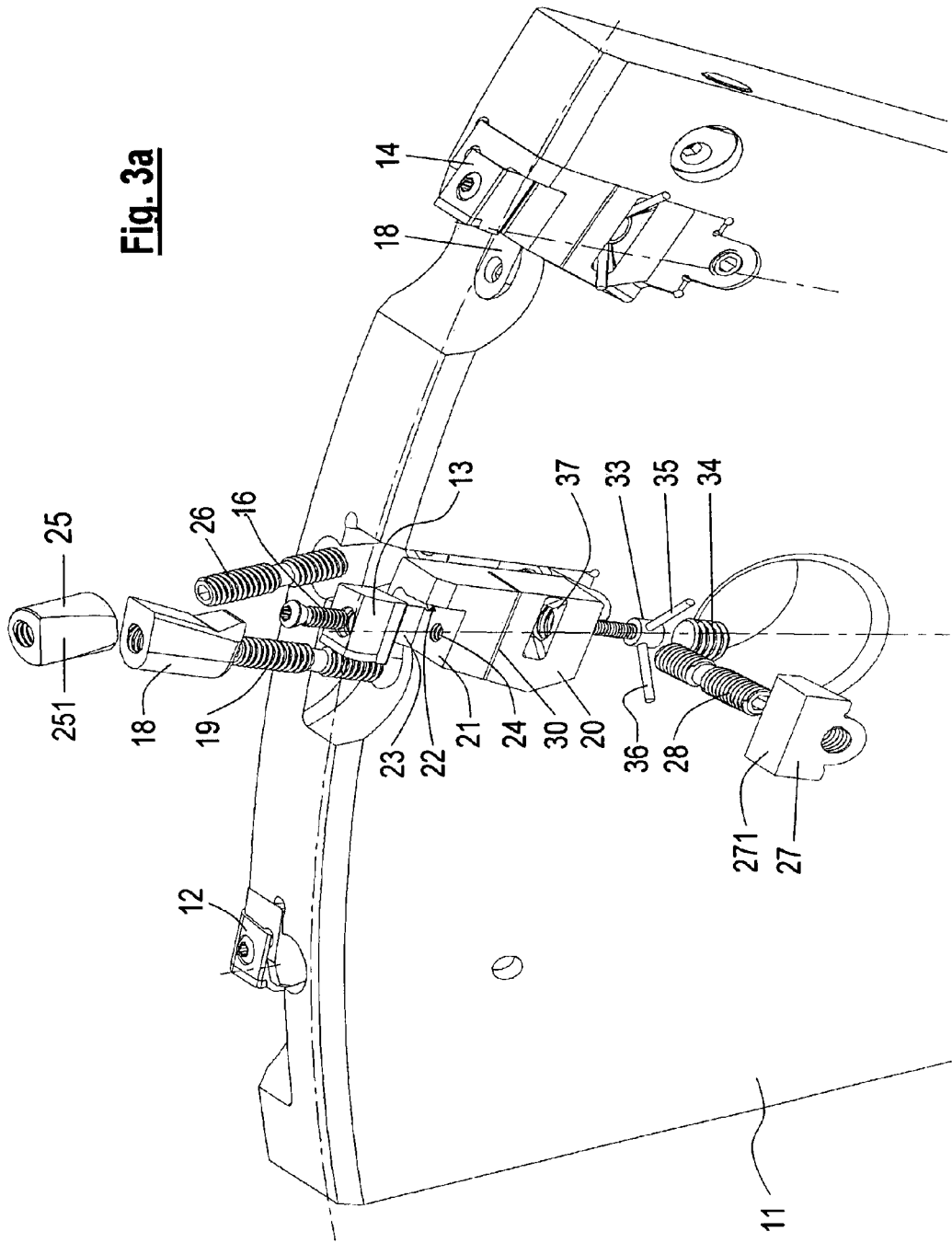
FIGS. 3a, 3b show an exploded drawing of the embodiment according to FIGS. 2a and 2b, FIGS. 4a-c show three views of a cutting insert which can be clamped laterally.
Figure 3B:
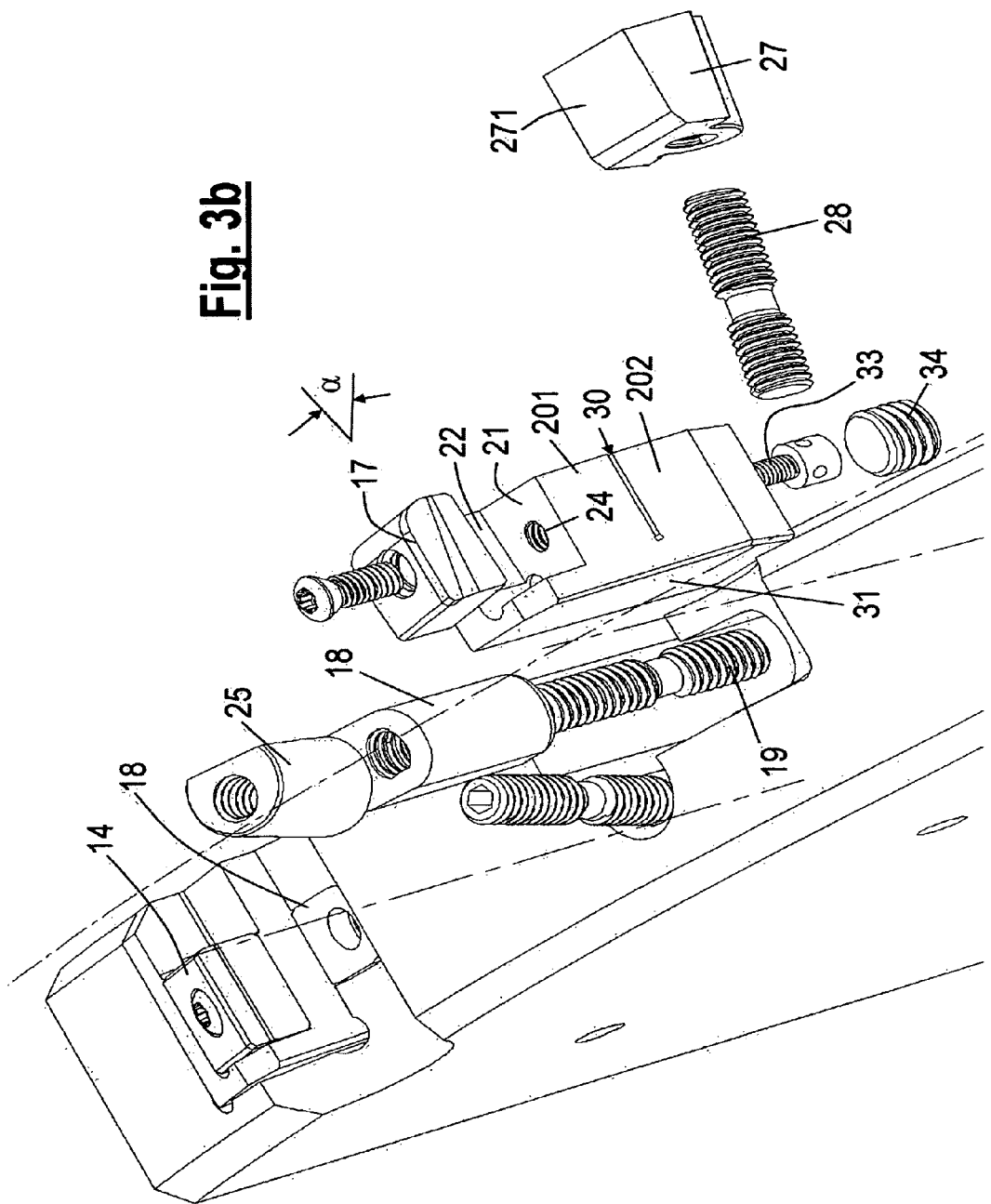
Figure 4A:
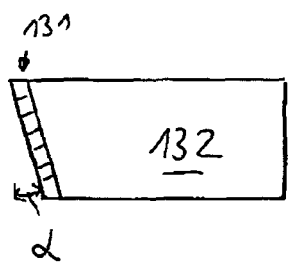
Figure 4B:
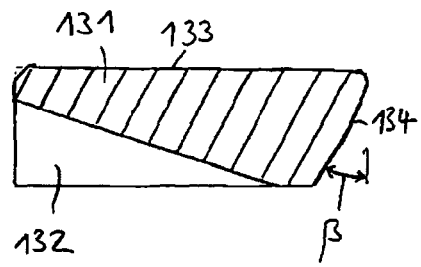
Figure 4C:
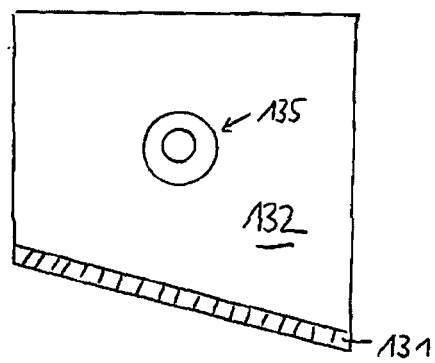

It can be seen in detail from FIGS. 2a and 2b and from FIGS. 3a and 3b that the cutting insert 13 is fastened by means of a clamping screw in the insert seat of a cassette 20, which has an insert seat having a locating surface 21 and two side surfaces 22 and 23. The cutting insert 13 is fixed by means of a clamping screw 16 which has a countersunk head. The clamping screw passes with its shank through the center hole of the cutting insert 13 and is screwed in place in a tapped hole 24 (see FIGS. 3a, 3b). The cutting insert has a cutting edge 17 which is part of a CBN inlet, which will be dealt with later. The cutting edge 17 runs out in a convexly curved manner toward the outside. Like the cutting insert 13, the cutting insert 12 is arranged in a cassette, the cassettes for the cutting inserts 12 and 13 being constructed in mirror symmetry but otherwise identically. Likewise screwed in place in a cassette is the cutting insert 14, the width of which is selected to be greater so that the bearing surface 23 can be arranged further to the left (see FIG. 1). All the cassettes are uniformly fixed with a clamping body 18, which can be actuated via a double-threaded screw 19. The clamping body 18 is angled at its bottom end, the obtuse angle selected being selected to be identical to the corresponding angular contour of the cassette.

Serving to axially adjust the cassette 20 is an adjusting body 25, which can be displaced via the double-threaded screw 26. This adjusting body has a wedge surface 251, by the longitudinal displacement of which the cassette and thus the cutting insert 13 can be moved axially. The adjusting body 27 having a wedge surface 271 serves for the radial adjustment and can be displaced by means of the double-threaded screw 28. The cassette 20 is of substantially parallelepiped-shaped construction and has a slot-shaped groove 30, which, as can be seen in particular from FIG. 3b, extends relatively far through the clamping body 20 up close to the rear wall 31 thereof. The part 201 lying above the groove 30 is moved approximately in the direction of the arrow 32 by expanding the groove 30, which leads to corresponding tipping of the cutting edge 17 by an angle α (shown greatly exaggerated). In this way, a fine setting of the tilt of the cutting insert or of the cutting edge can be produced. Serving to adjust the gap width is a double-threaded screw which engages in existing holes in the parts 201 and 202 and which is designed as a capstan screw 33, the head of which rests on a set screw 34 in the assembled state. Shown in FIG. 3a are socket wrenches 35 and 36, with which it is demonstrated how these wrenches are inserted and actuated. The actuation of the capstan screw is possible via the laterally accessible recess 37 in the cassette (see FIG. 3a).

For the axial, radial and angular adjustment of the cutting insert 12 or 13, first of all, with the tool fitted, the screw 19 has to be actuated for releasing the clamping body 18. After that, the adjusting screws 26 and 28 can be actuated via hexagon socket keys, via which the cutting insert can be displaced axially and radially. In addition, the tilt of the cutting edge, i.e. its angular position, can be set by a freely selectable angle by turning the capstan screw 33. This setting possibility is of course restricted by the selected slot arrangement owing to the fact that the groove distance can only be varied to a limited extent in accordance with the cassette deformability. After the selected setting of the cutting inserts, each insert is fixed via the clamping body 28 by tightening the screw 19. The cutting insert 14 can only be adjusted radially and with respect to the angular position of the cutting edge.

Details of the cutting inserts 13 and 14 used can be seen from FIGS. 4a-c and FIG. 5. The cutting insert 13 has a CBN inlet 131 which is brazed in place in a supporting body 132, which can be made, for example, of steel or carbide.

The CBN inlet 131 has a top cutting edge 133 and a shorter cutting edge 134 which is tilted by an angle β of 10° relative to the vertical to the cutting edge 133. These cutting edges 133, 134 merge into one another via a radius of, for example, 1 mm. The inclination, determined by the angle α, of the CBN insert 131 (see FIG. 4a) is preferably 6°. The cutting insert has a hole with a countersink 135 which is suitable for an M4 screw.

Figure 5:
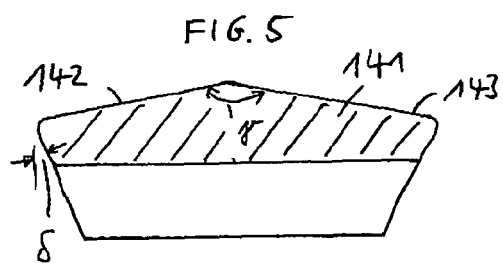
FIG. 5 shows a side view of a cutting insert which can be clamped tangentially.

FIG. 5 shows a side view of a cutting insert 14, the CBN inlet of which is designated by 141. This inlet has a cutting edge divided into two, with cutting edge sections 142 and 143, which enclose an angle γ of 175°. The cutting edges 142 and 143 merge at the end into inclined edges via a radius of, for example, 0.4 mm, said inclined edges being inclined at an angle δ of 2.5° (shown exaggerated in the drawing). As can be seen from FIG. 5, the CBN inlet 141 does not have to extend over the full height of the cutting insert.

The external milling cutters fitted with CBN inlets are used in particular for the subsequent machining of a crankshaft or camshaft.

The cast or forged crankshaft or camshaft is first of all subjected to an initial cutting operation by means of external milling cutters which are positioned at a plurality of locations of the crankshaft or camshaft for forming the main bearings and big-end bearings and for machining the cheeks. It is already the aim in this initial cutting operation to achieve the highest possible surface quality (with $R_z<50$ μm and concentricity tolerances<100 μm). The crankshaft or camshaft is then subjected to induction hardening, wherein if need be the hardening can be restricted to the bearings subsequently subjected to great loading. In a final cutting operation, the required final size quality with final size tolerances $R_z<10$ μm and concentricity tolerances≤30 μm is set using an external or internal milling cutter which is fitted with CBN inlets. All the cutting work is carried out dry, i.e. without the use of cooling lubricants.

What is claimed is:

1. A device for the precision machining of crankshafts or camshafts, comprising:
    a segmental holder; and
    a plurality of adjustable cutting inserts arranged on a periphery of the segmental holder, each cutting insert comprising a supporting body made of a first material and an inlet made of a second material having a greater hardness than the first material, the inlet having two cutting edge sections with a roof-shaped profile in which the two cutting edge sections form an enclosed angle with one another in a range between 173° to 178°, each cutting edge section having an edge radius that causes the two cutting edge sections to be inclined at an angle in a range between 2 to 3° relative to a plane perpendicular to a locating surface,
    wherein the plurality of cutting inserts are mounted laterally, radially and tangentially in an alternating manner on the periphery of the segmental holder.

2. The device as claimed in claim 1, wherein the edge radius is in a range between 0.4 mm to 1.5 mm.

3. A device for the precision machining of crankshafts or camshafts, comprising:
    a segmental holder; and
    a plurality of adjustable cutting inserts arranged on a periphery of the segmental holder, each cutting insert comprising a supporting body made of a first material and an inlet made of a second material having a greater hardness than the first material, the inlet having two cutting edge sections with a roof-shaped profile in which the two cutting edge sections form an enclosed angle with one another in a range between 75° to 85° and are connected to each other by a corner radius,
    wherein the plurality of cutting inserts are mounted laterally, radially and tangentially in an alternating manner on the periphery of the segmental holder.

4. The device as claimed in claim 3, wherein all the cutting inserts are fastened in the cassette by a setting device.

* * * * *